United States Patent [19]
Malcolm

[11] 3,972,442
[45] Aug. 3, 1976

[54] SAFETY EQUIPMENT

[75] Inventor: Brian Anthony Malcolm, Stockport, England

[73] Assignee: Simon-Carves Limited, Stockport, England

[22] Filed: Nov. 14, 1974

[21] Appl. No.: 523,929

[52] U.S. Cl. .................... 220/89 A; 116/114 AC; 200/61.08; 220/85 R; 206/459
[51] Int. Cl.² .................. B65D 25/00; B65B 57/02; B65B 57/18
[58] Field of Search ............. 220/85, 89 A; 73/49.2, 73/49.3, 49.8, 49 R; 137/551, 554, 797; 116/114 R, 114 P, 114 AC; 200/61.08, 81.00, 81.9 M; 250/222 R, 216 R

[56] References Cited
UNITED STATES PATENTS

| | | | |
|---|---|---|---|
| 2,230,961 | 2/1941 | Lewis | 220/89 A |
| 2,947,443 | 8/1960 | Sawyer | 220/89 A |
| 3,488,510 | 1/1970 | Raymond | 250/222 R |
| 3,834,581 | 9/1974 | Solter | 220/89 A |
| 3,859,619 | 1/1975 | Ishihara | 137/554 |

Primary Examiner—Richard E. Aegerter
Assistant Examiner—A. J. Mirabito
Attorney, Agent, or Firm—Norris & Bateman

[57] ABSTRACT

An explosion relief diaghragm or panel of the kind which forms a part of the wall of a vessel and which is adapted to give way in event of excessive pressure within the vessel as, for example, might be caused by an explosion, whereby the main structure of the vessel remains undamaged, and having its peripheral edge clamped between sealing gaskets, characterized by the provision of outwardly extending tongue-like portions at spaced intervals around said peripheral edge, and means adapted to sense the presence of each said tongue-like portion.

11 Claims, 4 Drawing Figures

SAFETY EQUIPMENT

This invention relates to an explosion relief diaphragm or panel of the kind (hereinafter termed of the kind referred to) which forms a part of the wall of a vessel and which is adapted to give way in event of excessive pressure within the vessel as, for example, might be caused by an explosion, whereby the main structure of the vessel remains undamaged.

In certain vessels it is essential that in normal use the explosion relief diaphragm or panel makes a gas-tight seal with the edges of the aperture in the vessel over which it is secured to prevent the ingress of air. This is important where air could mix with the contents of the vessel, for example powdered coal, to form an explosive mixture.

Thus, an explosion relief diaphragm or panel of the kind referred to is known which comprises a metal sheet whose peripheral edge is clamped between two sealing gaskets. Such an arrangement has a serious disadvantage in that it is possible for the sheet to be displaced, as for example through small surges of pressure in the vessel, or as a result of a mechanical impact, and thus break the seal and allow the ingress of air with a consequent explosion hazard.

It is an object of the present invention to overcome this disadvantage by providing simple and reliable means which can be used to activate an alarm in the event of displacement of an explosion relief diaphragm or panel.

Thus, according to the present invention an explosion relief diaphragm or panel of the kind referred to and having its peripheral edge clamped between sealing gaskets, is characterised by the provision of outwardly extending tongue-like portions at spaced intervals around said peripheral edge, and means adapted to sense the presence of each said tongue-like portion.

The invention will be further apparent from the following description with reference to the figures of the accompanying drawings which show, by way of example only, a number of forms of explosion relief diaphragm or panel embodying the invention.

Figure 1:
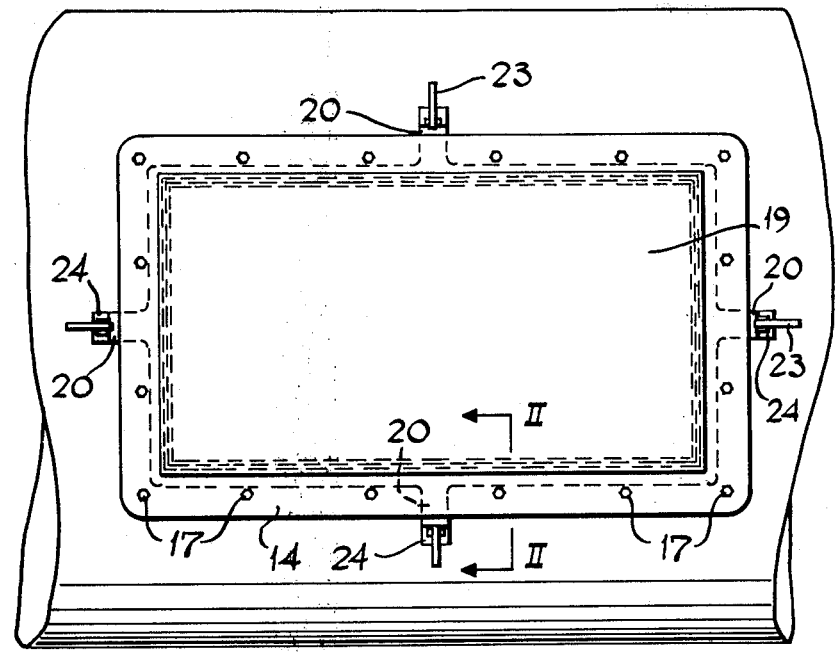
FIG. 1 shows a side elevation of a part of a vessel incorporating an explosion relief diaphragm or panel.
Figure 2:
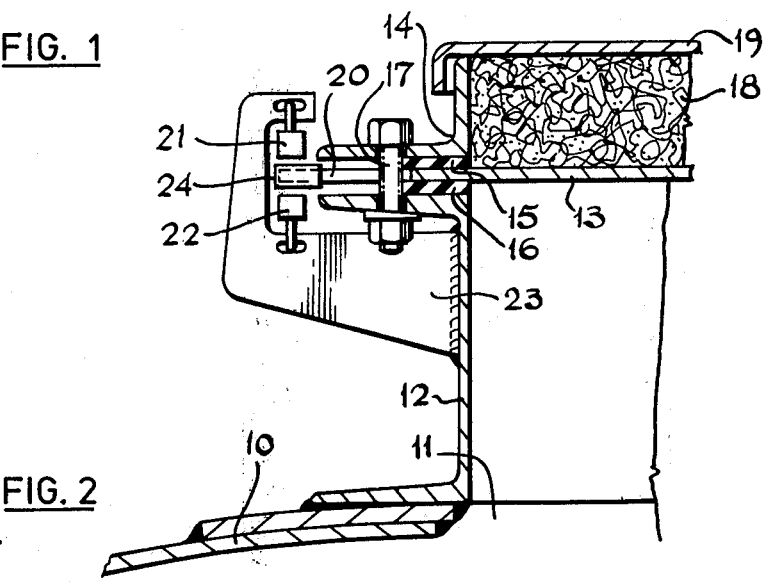
FIG. 2 shows a cross-section through the peripheral edge of the explosion relief diaphragm or panel on the line II—II of FIG. 1.

Referring now to FIGS. 1 and 2 of the drawings, it will be seen that a vessel has a cylindrical wall portion 10 in which there is a rectangular aperture 11. A rectangular frame 12 comprised by rolled steel channel members surrounds the aperture 11, the flanges of the channel members being outwardly directed.

An explosion relief panel comprised by a generally rectangular sheet of stainless steel 13 overlies the inner edges of the frame 12, thus to occlude the aperture 11. A further frame 14 formed by rolled steel angle members overlies the frame 12 whereby the peripheral edge of the sheet 13 is trapped between the two frames. Outer and inner sealing gaskets 15 and 16 respectively are provided between the flanges of the frame members 12 and 14 and the sheet 13. The sheet 13 is securely clamped in position by means of a plurality of bolts 17 disposed at spaced locations around the frame members 12 and 14. Each bolt 17 passes through the outwardly directed flanges of the two frame members and is located outwardly of the peripheral edge of the sheet 13.

The outer surface of the sheet 13 is protected from corrosion by the weather or otherwise by means of a slab of suitable insulating material 18 retained by an outer lid-like member 19.

In accordance with the invention the sheet 13 is formed with a plurality of tongue-like portions 20 disposed at spaced locations around its perimeter and each extending outwardly so that the end thereof remote from the main body of the sheet 13 protrudes outwardly from the outer edges of the frames 12 and 14, passing between the frames in the region between two adjacent bolts 17. Means to sense the presence of the tongue-like portions 20 is provided and comprised in this example by an encapsulated magnetically operable reed switch 21 and magnet 22 mounted on opposed sides respectively of each tongue-like portion by means of a supporting bracket 23 welded to the frame 12.

Each tongue-like portion 20 is provided with a clip-on sleeve 24 of ferrous material, and it will be understood that the presence of the sleeve 24 between the reed switch and magnet prevents magnetic flux from the magnet influencing the switch. Should the sheet 13 be displaced one or more of the tongue-like portions 20 will be drawn inwardly thereby causing the associated reed switch 21 to be actuated. It will be understood that each reed switch and magnet combination can be adjusted to have the required sensitivity. In a preferred arrangement each reed switch would be arranged to be normally closed and all would be wired in series.

It will be appreciated that it is not intended to limit the invention to the above example only, many variations, such as might readily occur to one skilled in the art, being possible without departing from the scope thereof.

Figure 4:
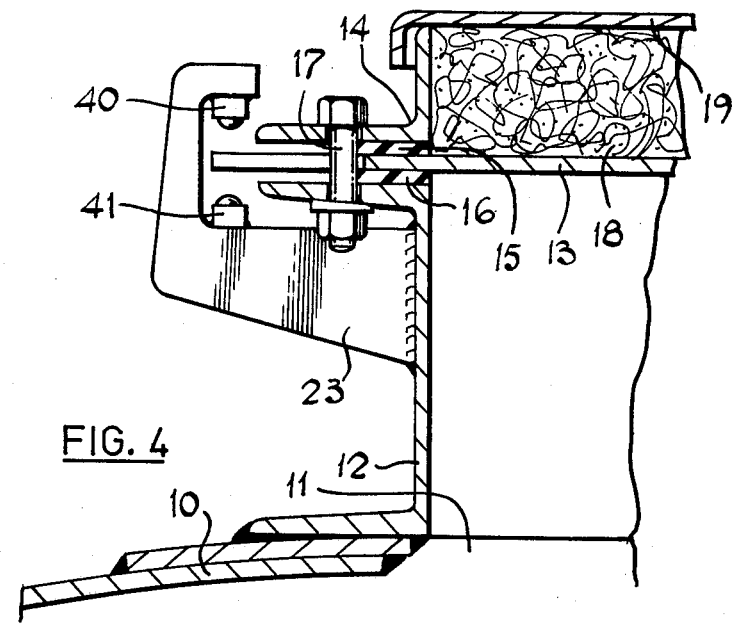
FIGS. 3 and 4 show views similar to that of FIG. 2 but of modified construction.
Figure 3:
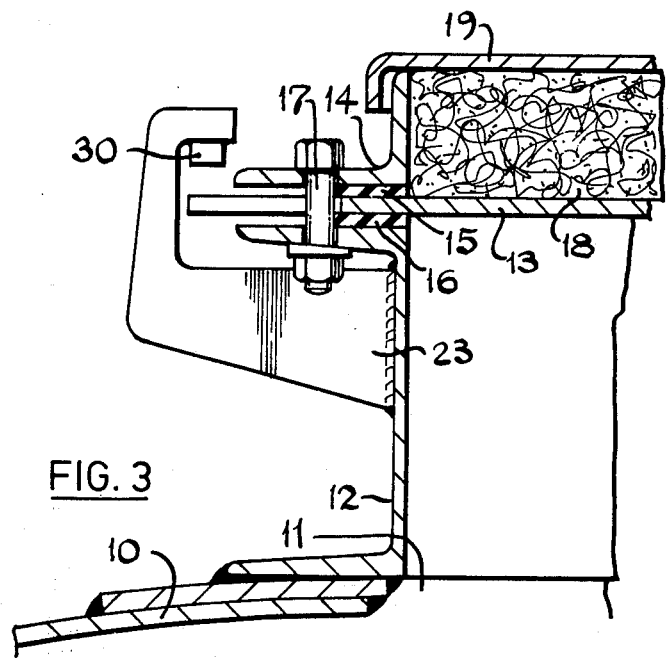

Thus, for example, as can be seen from FIG. 3, each reed switch 21, magnet 22 and ferrous metal sleeve 24 may be replaced by a proximity sensing transducer 30 arranged to give a signal on movement of a tongue-like portion 20 away therefrom. The transducer 30 is conveniently secured to the bracket member 23, but may be secured by other means if desired. Again, for example, and as shown in FIG. 4, each reed switch 21 and magnet 22 may be replaced by a light source 40 and photosensitive cell 41 respectively, the ferrous metal sleeve 24 again being omitted.

Yet again, for example, more than one tongue-like portion may be provided on each side of the panel and such portions may be particularly important in the corner regions of the panel.

What is claimed is:

1. In combination, an explosion relief diaphragm or panel and a vessel or the like, said vessel or the like having a wall aperture over which said diaphragm or panel extends with its periphery secured pressure tight to said wall by means including sealing gasket means, said diaphragm having a plurality of outwardly extending tongue-like portions at spaced intervals around the periphery of said diaphragm or panel, sensing means, and means for mounting said sensing means adjacent to said periphery so as to be operably responsive to the presence of each said tongue-like portion and adapted to signal a change in condition of said diaphragm or panel resulting in displacement of any of said tongue-like portions.

2. An explosion relief diaphragm or panel according to claim 1 wherein said sensing means responsive to the presence of each said tongue-like portion comprises firstly a ferrous metal member secured to the tongue-like portion, and secondly a magnetic reed switch and magnet disposed respectively on opposed sides of said ferrous metal member.

3. An explosion relief diaphragm or panel according to claim 1 wherein said sensing means responsive to the presence of each said tongue-like portion comprises a proximity sensing transducer.

4. An explosion relief diaphragm or panel according to claim 1 wherein said sensing means responsive to the presence of each said tongue-like portion comprises a light source and photo-sensitive cell disposed respectively on opposed sides of the tongue-like portion.

5. An explosion relief diaphragm or panel according to claim 1 and which is of rectangular shape.

6. An explosion relief diaphragm or panel according to claim 5 wherein there are a plurality of said tongue-like portions on at least some of the sides thereof.

7. An explosion relief diaphragm or panel according to claim 5 which is formed from stainless steel.

8. An explosion relief diaphragm or panel according to claim 6 which is formed from stainless steel.

9. An explosion relief diaphragm or panel according to claim 5 wherein the peripheral edge of the panel is clamped between frame members with a gasket disposed between the panel and each frame member.

10. An explosion relief diaphragm or panel according to claim 6 wherein the peripheral edge of the panel is clamped between frame members with a gasket disposed between the panel and each frame member.

11. An explosion relief diaphragm or panel according to claim 7 wherein the peripheral edge of the panel is clamped between frame members with a gasket disposed between the panel and each frame member.

* * * * *